(12) United States Patent
Stubler et al.

(10) Patent No.: US 7,174,920 B2
(45) Date of Patent: Feb. 13, 2007

(54) METHOD FOR REPAIRING PIPES

(75) Inventors: Jérôme Stubler, Paris (FR); Fernand De Melo, Paris (FR); Benoît Lecinq, Paris (FR)

(73) Assignee: Freyssinet International (STUP) (FR)

( * ) Notice: Subject to any disclaimer, the term of this patent is extended or adjusted under 35 U.S.C. 154(b) by 547 days.

(21) Appl. No.: 10/486,063

(22) PCT Filed: Aug. 2, 2002

(86) PCT No.: PCT/FR02/02793

§ 371 (c)(1),
(2), (4) Date: Feb. 5, 2004

(87) PCT Pub. No.: WO03/014614

PCT Pub. Date: Feb. 20, 2003

(65) Prior Publication Data

US 2004/0231740 A1 Nov. 25, 2004

(30) Foreign Application Priority Data

Aug. 7, 2001 (FR) .................................. 01 10563

(51) Int. Cl.
*F16L 55/16* (2006.01)

(52) U.S. Cl. .......................... 138/99; 138/105; 138/97; 138/176; 138/172; 405/184.1

(58) Field of Classification Search ............... 138/99, 138/97, 105, 153, 172, 176, DIG. 5; 405/184.1, 405/154.1, 158; 285/288.2
See application file for complete search history.

(56) References Cited

U.S. PATENT DOCUMENTS

| 1,534,425 | A | * | 4/1925 | Stowell | 285/285.1 |
|---|---|---|---|---|---|
| 1,910,594 | A | * | 5/1933 | La Mare | 264/34 |
| 2,627,378 | A | * | 2/1953 | Hirsh | 242/438 |
| 4,342,338 | A | | 8/1982 | Glennie | 138/99 |
| 5,527,070 | A | * | 6/1996 | Blackwell | 285/45 |
| 5,632,307 | A | * | 5/1997 | Fawley et al. | 138/99 |
| 5,727,907 | A | | 3/1998 | Silva et al. | 405/188 |
| 5,765,600 | A | * | 6/1998 | Newaz et al. | 138/141 |
| 5,988,227 | A | * | 11/1999 | Magoffin | 138/110 |
| 6,336,983 | B1 | * | 1/2002 | Fawley | 156/94 |
| 6,543,487 | B2 | * | 4/2003 | Bazinet | 138/99 |
| 7,033,114 | B2 | * | 4/2006 | De Melo et al. | 405/184.1 |

FOREIGN PATENT DOCUMENTS

| FR | 2 247 299 | 5/1975 |
|---|---|---|
| FR | 2 822 177 | 9/2002 |

OTHER PUBLICATIONS

International Search Report for PCT/FR02/02793 dated Jan. 7, 2003.

* cited by examiner

*Primary Examiner*—Patrick F. Brinson
(74) *Attorney, Agent, or Firm*—Cantor Colburn LLP

(57) ABSTRACT

The invention concerns a method for repairing a pressurized fluid supply pipeline (1) comprising a series of buried prestressed concrete pipe segments (2, 3, 4) which consists in: providing excavations in the trench, beneath suitably set portions (6, 7) of the pipe (1), cleaning up said pipe portions, installing and tensioning the prestressed reinforcements (12) around said portions of the pipe and filling up the excavations with earth material by compacting said material.

11 Claims, 3 Drawing Sheets

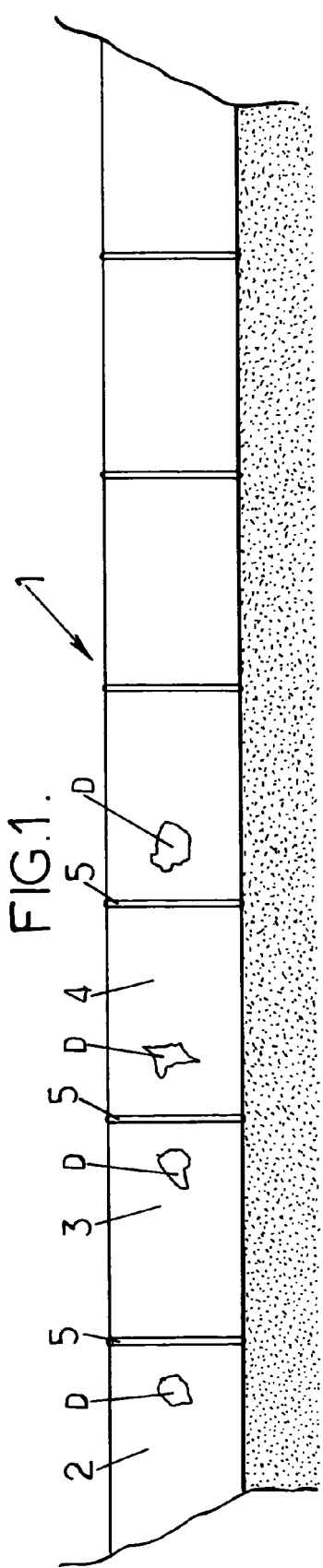
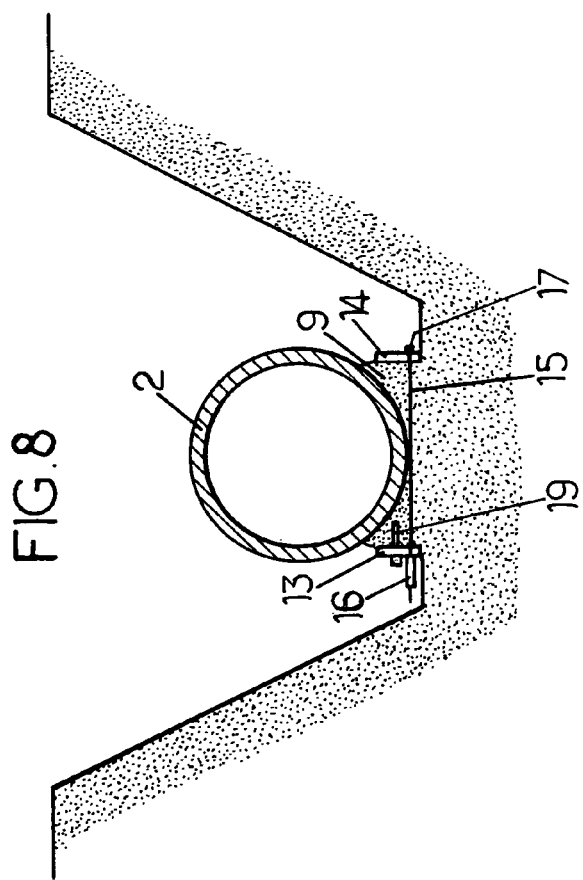
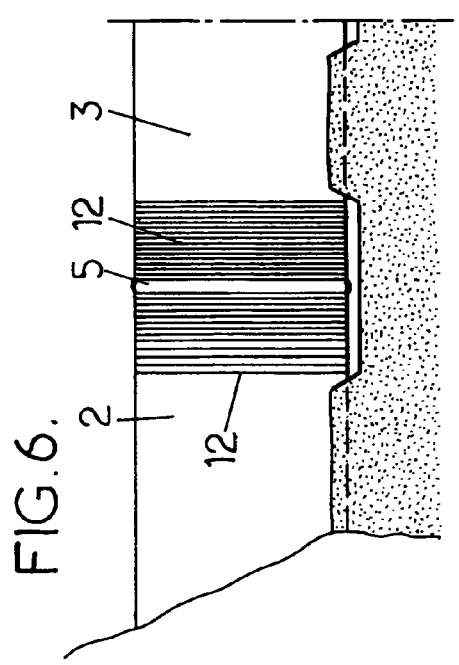

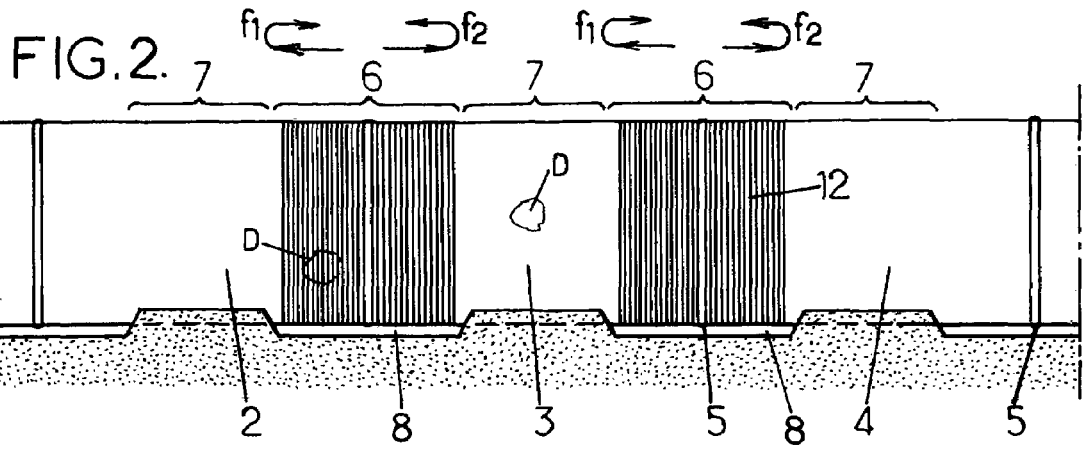
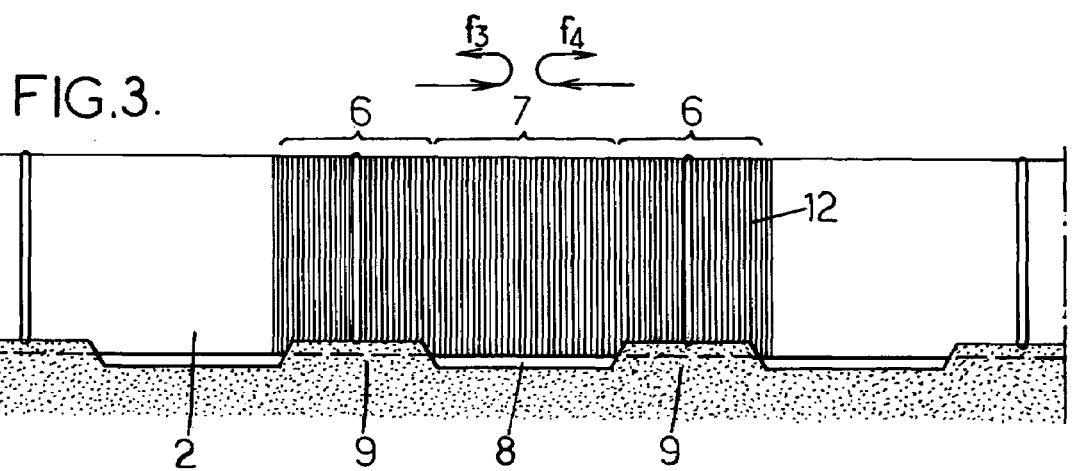
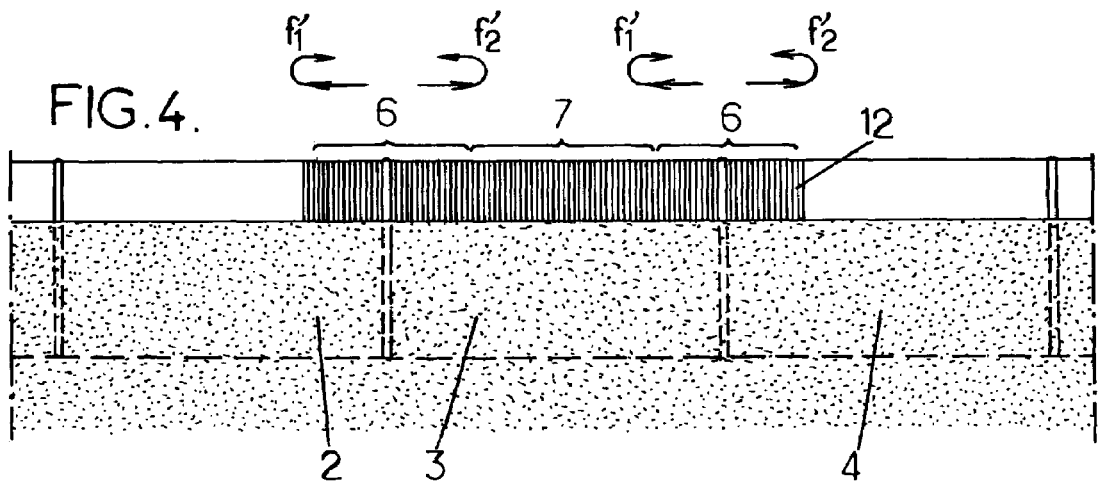

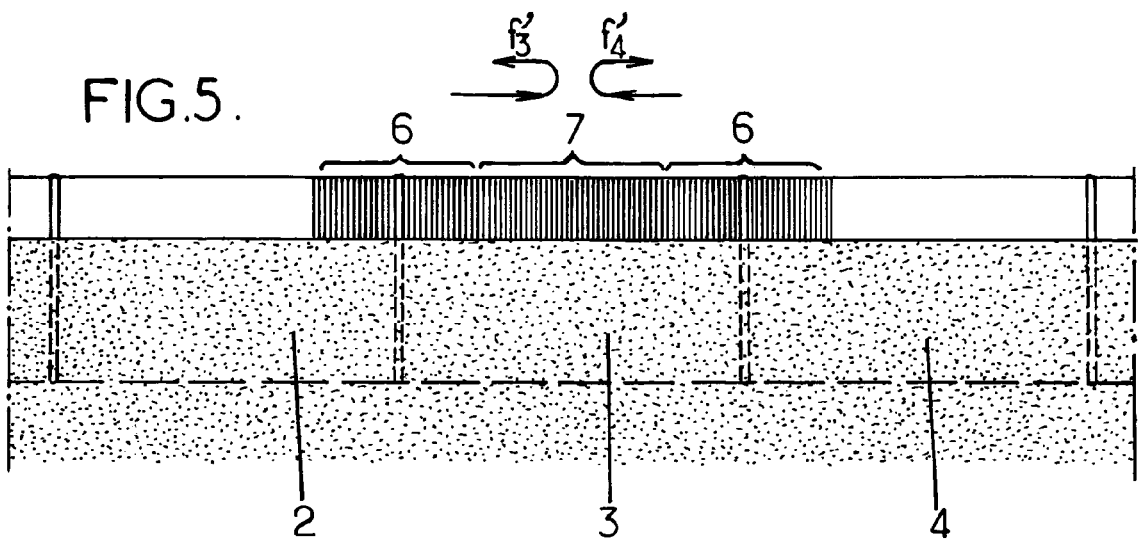
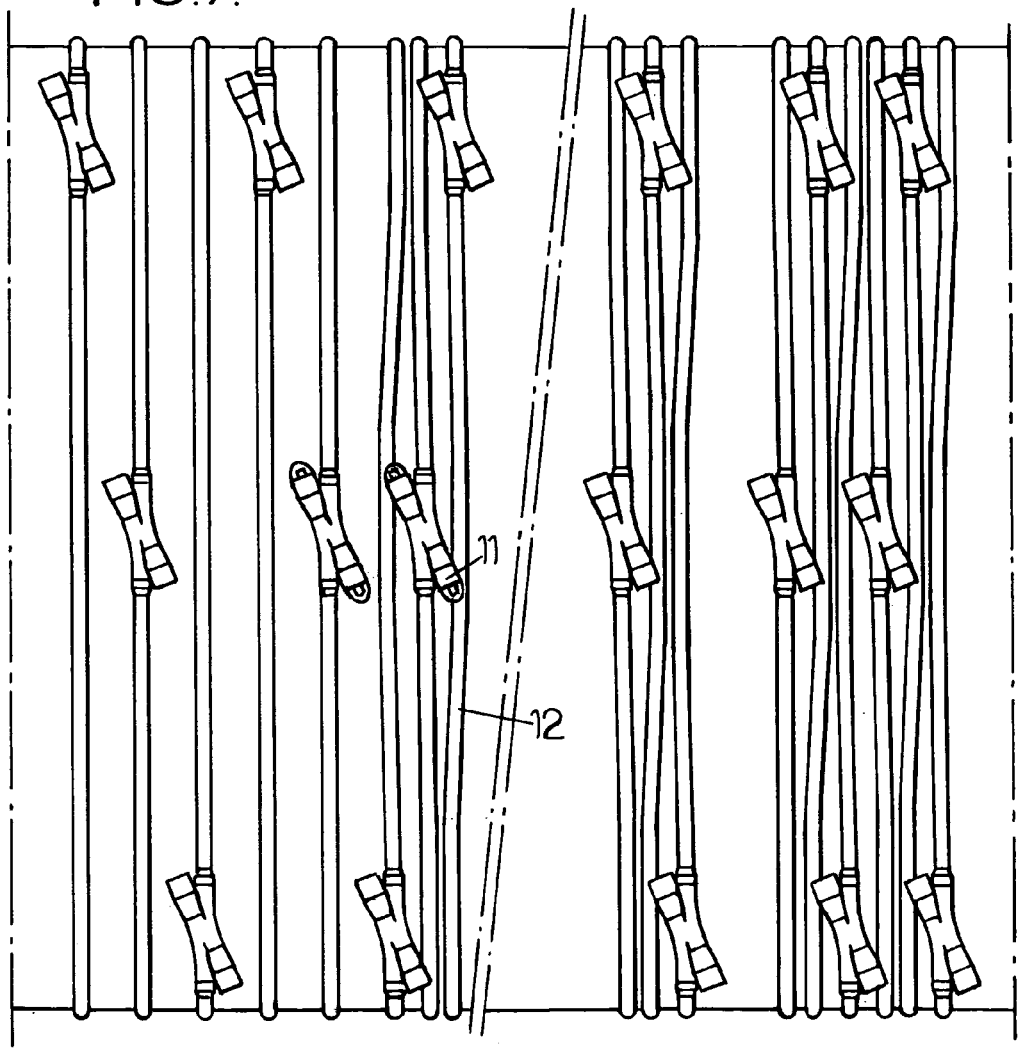

METHOD FOR REPAIRING PIPES

BACKGROUND OF THE INVENTION

The present invention relates to a method of repairing buried pipelines.

More particularly, the invention concerns a method of repairing pipelines for conveying pressurized fluid that are formed by assembling prestressed concrete pipe segments end to end.

These pipelines belong to a water supply network, for example. In their most common form, these pipelines are formed by an end-to-end assembly of prestressed concrete pipe segments having a diameter varying from approximately 0.5 m to 6 m. Water circulates therein at a pressure which may reach approximately twenty bars. These concrete pipe segments may comprise an inner metal covering (liner). However, this is not designed to withstand the pressure forces due to the circulating fluid. These forces are absorbed by the prestressing of the concrete, produced by means of spirally wound wires on the exterior of the concrete core of the pipe segment. During the prefabrication of this segment, its concrete core is caused to rotate about its axis in order to receive the wire, which is braked in order to be tensioned. This wire is then protected against corrosion by spraying an additional layer of concrete or mortar to a few tens of millimeters.

In spite of this protective layer and the passivation of the steel constituting these prestressing wires, it sometimes happens that the prestressing wires are the center of a corrosion which generally results in deterioration of the protective covering, and therefore in acceleration of the phenomenon which may cause breakage of the wires and therefore a structural weakening of the pipeline, or even cause it to burst under the effect of the pressure of the circulating fluid.

After the incident has been detected on one or more segments using preventive methods (especially using acoustic detection), the traditional methods consist first in excavating the material (sand, earth or the like) surrounding the damaged segments and then either purely and simply replacing the segments in question, which requires prior drainage of the supply network entailing considerable disruption to the running of the network, or in carrying out an unsophisticated repair to the outer surface of the pipeline when the latter has not yet given way.

The drawback of these known repair methods is that they do not take into account the following operating constraints:
  the excavation of the earth surrounding a pipeline under fluid pressure presents a risk for the safety of the operators on the one hand and for the good mechanical stability of the joints between the segments on the other hand, these joints not being able to work in bending and being able to work very little in shear;
  not introducing additional stresses or deformations into the pipeline during the repair;
  restoration of the seating on the soil after repair is necessary in order to avoid differential settlements;
  obtaining a high level of protection for the new prestressing reinforcements;
  durability of the old concretes and mortars situated under the new reinforcements must be obtained;
  the profile of the prestressing along the pipeline must be optimized.

The object of the present invention is in particular to improve the safety and reliability of the methods of repairing such pipelines.

SUMMARY OF THE INVENTION

According to the invention, a method of repairing a pipeline for the supply of a pressurized fluid, composed of a succession of buried prestressed concrete pipe segments, comprises the following steps:
  producing a trench in order to uncover a length of the pipeline;
  producing a first excavation within the trench under a first portion of the pipeline that is substantially centered with respect to a junction between two adjacent segments;
  placing and tightening at least one prestressing reinforcement around the first portion of the pipeline;
  filling the first excavation with soil material and compacting said material;
  producing a second excavation within the trench under a second portion of the pipeline that is adjacent to the first portion and included within a single segment;
  placing and tightening at least one prestressing reinforcement around the second portion of the pipeline;
  filling the second excavation with soil material and compacting said material.

By virtue of these provisions, it is possible to restore a damaged area of the pipeline while at the same time complying with the technical constraints associated with this type of structure.

In preferred embodiments of the invention, recourse may additionally be had, where appropriate, to one and/or other of the following provisions:
  the first and second portions of the pipeline have a length that is substantially equal to half the length of a pipe segment,
  reinforcements are arranged with a regular spacing along the first portion of the pipeline, one reinforcement in two is tensioned starting from the junction toward the ends of the first portion while spacing out the reinforcements by approximately twice the value of the regular spacing, and then, returning toward the junction, the remaining reinforcements are tensioned;
  reinforcements are arranged with a regular spacing along the second portion of the pipeline, one reinforcement in two is tensioned starting from the ends toward the middle of the second portion while spacing out the reinforcements by approximately twice the value of the regular spacing, and then, returning toward the ends, the remaining reinforcements are tensioned;
  at the ends of a repaired area of the pipeline, reinforcements are arranged and tensioned around the pipeline with a spacing that is greater than in said first and second portions;
  in order to compact the soil material in one of the excavations, two shoes are positioned underneath the pipeline, on either side of the soil material filling the excavation and parallel to the pipeline, with a linking system being placed between the shoes, and the linking system is actuated in order to bring the shoes toward one another and compress said soil material; to facilitate compacting, it is possible to introduce spindles into the gap between said shoes and make these spindles vibrate while the linking system is being actuated;
  the linking system comprises at least two metal strands connected to one of the shoes and passing through the other shoe, the actuation consisting, by means of at least one cylinder, in pulling on the ends of the strands that protrude beyond said other shoe while pressing against the latter;

before filling each excavation under a portion of the pipeline, the reinforcements placed around said portion are tensioned to a tension representing a fraction of a specified prestress value; after said excavation has been filled and the soil material has been compacted, the trench is then partially backfilled in line with said portion so as to leave reinforcement-immobilizing devices visible, an additional tension is applied to the reinforcements to the specified prestress value and then the backfilling of the trench is completed; advantageously, the additional tension may be applied gradually during the backfilling;

the reinforcements used are individually sheathed prestressing strands.

BRIEF DESCRIPTION OF THE DRAWINGS

FIG. 1 is an elevation of a trench produced in a first step of a method according to the invention for repairing a damaged pipeline;

FIGS. 2 and 3 are elevations illustrating the process of placing and tensioning reinforcements around portions of the pipeline depicted in FIG. 1;

FIGS. 4 and 5 illustrate a process of additionally tensioning the reinforcements of FIGS. 2 and 3;

FIG. 6 is an elevation of one end of the repaired area of the pipeline;

FIG. 7 is a plan view of a series of consecutive reinforcements fitted with their anchorings; and FIG. 8 is a cross-sectional view of a portion of the pipeline under which device for compressing the soil is installed.

DESCRIPTION OF PREFERRED EMBODIMENTS

A buried pipeline 1 formed by a succession of pipe segments 2, 3, 4 assembled end to end has been depicted in FIG. 1.

FIG. 1 shows a certain length of pipeline uncovered by digging a trench into the soil. The pipeline 1 is damaged along this length, its skin presenting defects D detected beforehand by means of a known method, for example an acoustic method. The detection is not necessarily very accurate. In practice, the trench can be advanced along the length of the pipeline: after a first length of the pipeline has been exposed, repairs are carried out starting from one end of the trench and, after having started to backfill at this end, the trench continues to be dug out at the other end. It is possible to proceed in this manner until the exposed pipe segments present no more apparent defects.

Digging the trench consists in removing the soil material from each side of the pipeline 1 over a sufficient width to allow the intervention of human operators. The depth of the trench is slightly larger than that of the base of the pipeline. However, care is taken not to remove the soil material present just below the pipeline so as to support the weight of the pipeline loaded with water.

The repairs carried out according to the invention do not generally require the pipeline to be drained. However, it may be prudent to reduce the pressure of the circulating fluid by a small degree on account of the removal of the earth around the pipeline in the damaged areas, which no longer contributes to counterbalancing the internal pressure. The reduced pressure is calculated as a function of factors such as the topology of the terrain, the total length of the trench, the nature of the defects found, etc. The reduction is brought about by intervening on the installations upstream of the area to be repaired.

Each of the pipe segments consists of a concrete core having a diameter varying from approximately 0.5 m to 6 m, which may or may not contain an inner metal liner, and having an average unit length of approximately 7.5 m, for example.

These segments 2, 3, 4 are intended to carry pressurized water, of the order of approximately 20 bar, and are largely or totally buried in earth or in sand. In this way, the surrounding soil exerts a counterpressure on the outer walls of the segments 2, 3, 4.

In order to improve the resistance of these segments to the pressure of the fluid, prestressing wires are spirally wound onto their external surface in one or two layers and tensioned as they are being wrapped around. An additional layer of sprayed mortar or concrete covers these prestressing wires in order to protect them against any corrosive agents which may be present in the soil.

Each of the joints 5 between the segments 2, 3, 4 is formed by fitting a straight end of one of the adjacent segments into a widening provided at the end of the other segment, a sealing mortar being applied along the circumference of the joint. The pipeline 1 thus constitutes a very rigid assembly which does not allow any bending or shear forces at the joints.

Corrosion of the prestressing wires subsequent to the penetration of aggressive agents into the protective mortar layer may lead to the breakage of one or more metal wires. These breakages are generally focused at points of preferential penetration for the aggressive agents, and lead to delamination and fragmentation of the protective mortar layer under the effect of shear. These delaminations are the apparent defects D that make repair necessary.

In order to repair the pipeline according to the invention, an additional prestress is installed at the outside of the pipeline by means of reinforcements 12 arranged around the pipeline and distributed along the repaired area. These reinforcements are advantageously prestressing strands, and preferably individually sheathed strands, which improves their corrosion resistance.

Before installing these strands 12, it is advisable to clean up the damaged area or areas by a mechanical treatment (brushing, hammering, scouring, etc.), optionally supplemented by a chemical treatment, especially in the form of a corrosion-inhibiting agent. After these treatments, mortar is reapplied to the areas that have been scraped for the purpose of evening out the surface of the pipeline.

In order to place the reinforcements around the pipeline 1, it is necessary to make excavations under the pipeline. To prevent this from inducing undesirable longitudinal bending or shear stresses at the joints, suitably localized excavations are undertaken.

For this purpose, a distinction is made between two types of portions that succeed one another along the pipeline (FIGS. 2 and 3):

first pipeline portions 6 centered with respect to the joints 5 between the pipe segments;

second pipeline portions 7 interspersed between the first portions 6 and each included within a single pipe segment. These second portions 7 are centered with respect to the middles of the segments.

The length of these portions 6, 7 is of the order of half the length of a segment 2, 3, 4. By way of example, with the aforementioned 7.5 m segments, the first portions 6 may measure 3.5 m and the second portions 7 may measure 4 m.

In a first step, an excavation is produced within the trench under one of the first portions 6. After the earth situated under the pipeline has been cleared, any clean-up work required is carried out and then the prestressing strands 12 are put in place. The symmetry of the excavation on either side of the plane of the joint 5 and the limited extent of the overhang of each side of this joint (about a quarter of the length of a segment) enable the undesirable bending and shear forces that are produced at the joint to be minimized. As indicated in FIG. 2, it is possible for excavations 8 to be formed at the same time under several first portions 6.

The strands 12 are introduced into the excavation so as to surround the pipeline 1 with one or two revolutions. They are attached to the upper side of the pipeline by means of an immobilizing device 11 (FIG. 7) designed to receive the two ends of one or more of the strands 12.

In the embodiment illustrated by FIG. 7, each strand 12 makes a single revolution around the pipeline, and the immobilizing devices 11 have a general X shape, with two curved channels each intended to receive one end of a strand. Each of its channels has a frustoconical mouth that is able to receive a frustoconical anchoring jaw for immobilizing the end of the strand. To tighten said strand, the jaws are put in place and one of the ends protruding from the immobilizing device 11 (or, symmetrically, on both ends) is pulled by means of a cylinder actuator, the jaw being pushed toward the frustoconical mouth in the process.

When individually sheathed strands are used, preferably with a protective material such as a grease inside the sheath, it is advisable to strip the ends of the strand which will be gripped by the frustoconical jaws before installing the latter. To complete the protection against corrosion, use may be made of immobilizing devices 11 made of steel covered with a protective layer of plastic. After the strand has been finally tensioned, its ends protruding from the jaws may be cut and plastic stoppers may be placed over these ends, which makes it possible to have a thickness of plastic (for example a high-density polyethylene) over the entirety of the corrosion-sensitive prestressing elements.

As an alternative, it is possible for each strand to make two revolutions of the pipeline and for immobilizing devices such as that described in French patent application 01 03537 to be used.

In FIG. 2, there has been depicted a series of strands 12 placed around pipe segments and tensioned symmetrically so as to avoid dissymmetrical stresses on the joints.

In general, the structural calculation defines a prestressing requirement per unit length, which determines on the one hand a strand density, as number of turns per meter of pipeline, and on the other hand a tension setpoint value for each strand. The strands 12 are placed with a substantially constant spacing between two neighboring strands, corresponding to the inverse of the number of turns per meter of pipeline. As shown in FIG. 7, when this spacing is relatively small, the anchoring devices 11 may be arranged in a staggered fashion on the upper side of the pipeline in order to have space to install them and to equip them with the cylinder actuator.

FIGS. 2 to 5 illustrate a possible progression of the operations of placing and tensioning prestressing reinforcements 12 around the pipeline. It should be noted that these operations may also be carried out following various other sequences.

The tensioning procedure illustrated by FIG. 2 is applied in order to attain only a fraction (for example 50%) of the tension setpoint value. This procedure is for example as follows for each of the first portions 6:

one strand out of every two strands is first of all tightened in an outward movement starting from the joint 5 in the direction of the second adjacent portions 7; and then the remaining strands are tightened in a return movement, returning toward the joint 5.

These outward and return movements are illustrated by the arrows f1, f2 in FIG. 2.

The following phase, illustrated by the cross section of FIG. 8, consists in filling the excavation formed under the first portion 6 with the soil material 9 that has previously been removed, and then in compacting this material under the pipeline in order to form a sole that locally reestablishes the seating of the pipeline.

Compaction of these soles is advantageously effected using two shoes 13, 14 positioned below the pipeline on each side of the material 9 with which the excavation 8 has been filled. These shoes are oriented parallel to the pipeline and interconnected by a linking system 15–17 enabling them to be brought closer to one another while compressing the material 9.

In the example of FIG. 8, the linking system comprises metal strands 15, for example prestressing strands. Each of these strands 15 is connected to one of the shoes 14, for example by means of an extruded sleeve 17 that bears against the edge of an aperture provided in this shoe 14 and through which the strand 15 passes. Its other end passes through the opposite shoe 13, where a cylinder actuator 16 is positioned. This actuator 16 bears against this shoe 13 and is activated in order to pull on the protruding end of the strand 15.

In order to improve compaction of the material 9, the shoes 13, 14 are accompanied by a vibration-inducing system of the type commonly used for vibrating concrete. This system comprises vibrating spindles 19 which, passing through the shoes 13, 14, penetrate the compacted layer of earth. The vibrations transmitted by these spindles during the activation of the actuators 16 bring about a decrease in the level of voids in the material 9 and therefore an improvement in its consolidation.

After reestablishing the seating of the pipeline 2 under the first portions 6, other excavations are made within the trench under the second pipeline portions 7 adjacent to the first portions 6 that have just been repaired.

The procedure is similar to that described above for the first portions 6. If necessary, the surface of the pipeline is cleaned up in the area of the second portion 7 that has been exposed by the excavation 8, and then the reinforcements 12 are placed with the required spacing. The tensioning procedure illustrated by FIG. 3 is applied in order to attain the same fraction (for example 50%) of the tension setpoint value. This procedure is as follows for one of the second portions 7:

one strand out of every two strands is first of all tightened in an outward movement directed from the ends of the portion 7 toward its middle; and then the remaining strands are tightened in a return movement, returning toward the ends.

The excavation 8 is then filled with soil material that is compacted in the same way as previously.

This procedure is repeated step by step over a certain length of pipeline within the trench. At this stage, the strands 12 positioned around the first and second portions 6, 7 of the pipeline are tightened to only a certain percentage of the setpoint value, which ensures that they are adequately positioned around the pipeline and provides a first prestressing phase.

Tensioning may be completed subsequently after the trench has been partially backfilled, as illustrated by FIGS. 4 and 5. The height of backfill is chosen so as to leave sufficient access to the immobilizing devices so that the cylinder actuator used for tightening the strands 12 can be installed; the additional tensioning operation, to the setpoint value, may be carried out following a sequence similar to the first tensioning operation, with outward and return movements in each of the first and second portions 6, 7. These outward and return movements, where one reinforcement in two is tensioned, are illustrated by the arrows $f_1$ and $f_2$ in FIG. 4 (first portions 6), and by the arrows $f_3$ and $f_4$ in FIG. 5 (second portions 7).

When these tensioning operations are finished, the trench can be completely backfilled.

As an alternative, the additional tension is applied gradually during the backfilling. For this, it is possible to proceed in several successive backfilling steps to the level illustrated by FIGS. 4 and 5, increasing the tension applied to the strands 12 at each step.

In order to optimize the profile of the prestressing in the vicinity of the end of the repaired area or of another particular aspect, it is possible to locally increase the spacing between the strands 12 along the pipeline relative to the spacing adopted in the previously described portions 6 and 7, as depicted in FIG. 6.

The invention claimed is:

1. A method of repairing a pressurized-fluid supply pipeline composed of a succession of buried prestressed concrete pipe segments, comprising the following steps:
    producing a trench in order to uncover a length of the pipeline;
    producing a first excavation within the trench under a first portion of the pipeline that is substantially centered with respect to a junction between two adjacent segments;
    placing and tightening at least one prestressing reinforcement around the first portion of the pipeline;
    filling the first excavation with soil material and compacting said material;
    producing a second excavation within the trench under a second portion of the pipeline that is adjacent to the first portion and included within a single segment;
    placing and tightening at least one prestressing reinforcement around the second portion of the pipeline;
    filling the second excavation with soil material and compacting said material.

2. The method as claimed in claim 1, in which the first and second portions of the pipeline have a length that is substantially equal to half the length of a pipe segment.

3. The method as claimed in claim 1, in which reinforcements are arranged with a regular spacing along the first portion of the pipeline, one reinforcement in two is tensioned starting from the junction toward the ends of the first portion while spacing out the reinforcements by approximately twice the value of the regular spacing, and then, returning toward the junction, the remaining reinforcements are tensioned.

4. The method as claimed in claim 3, in which reinforcements are arranged with a regular spacing along the second portion of the pipeline, one reinforcement in two is tensioned starting from the ends toward the middle of the second portion while spacing out the reinforcements by approximately twice the value of the regular spacing, and then, returning toward the ends, the remaining reinforcements are tensioned.

5. The method as claimed in claim 1, in which, at the ends of a repaired area of the pipeline, reinforcements are arranged and tensioned around the pipeline with a spacing that is greater than in said first and second portions.

6. The method as claimed in claim 1, in which, in order to compact the soil material in one of the excavations, two shoes are positioned underneath the pipeline, on either side of the soil material filling the excavation and parallel to the pipeline, with a linking system being placed between the shoes, and the linking system is actuated in order to bring the shoes toward one another and compress said soil material.

7. The method as claimed in claim 6, in which spindles are introduced into the gap between said shoes, and these spindles are made to vibrate while the linking system is being actuated.

8. The method as claimed in claim 6, in which the linking system comprises at least two metal strands connected to one of the shoes and passing through the other shoe, the actuation consisting, by means of at least one cylinder, in pulling on the ends of the strands that protrude beyond said other shoe while pressing against the latter.

9. The method as claimed in claim 1, in which, before filling each excavation under a portion of the pipeline, the reinforcements placed around said portion are tensioned to a tension representing a fraction of a specified prestress value, and in which, after said excavation has been filled and the soil material has been compacted, the trench is partially backfilled in line with said portion so as to leave reinforcement-immobilizing devices visible, an additional tension is applied to the reinforcements to the specified prestress value, and then the backfilling of the trench is completed.

10. The method as claimed in claim 9, in which the additional tension is applied gradually during the backfilling.

11. The method as claimed in claim 1, in which said reinforcements are individually sheathed prestressing strands.

* * * * *